(12) United States Patent
Kim et al.

(10) Patent No.: US 6,667,693 B1
(45) Date of Patent: Dec. 23, 2003

(54) SCREEN PROTECTION METHOD FOR IMAGE DISPLAY APPARATUS

(75) Inventors: Dong Hyeon Kim, Daeku (KR); Hyung Il Lee, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,129

(22) Filed: Dec. 30, 1999

(30) Foreign Application Priority Data

Dec. 31, 1998 (KR) .............................. 98-63574

(51) Int. Cl.[7] .............................. G08B 5/00; G08B 25/00
(52) U.S. Cl. .................. 340/815.4; 340/525; 340/461; 345/682; 348/564; 725/33
(58) Field of Search .............................. 340/815.4, 525, 340/461; 345/115–117, 672, 682; 348/563, 569, 564, 173; 725/33, 32

(56) References Cited

U.S. PATENT DOCUMENTS

| | | | | |
|---|---|---|---|---|
| 4,404,500 A | * | 9/1983 | Stow .......................... | 315/386 |
| 4,555,694 A | * | 11/1985 | Yanagishima et al. ...... | 340/525 |
| 5,006,829 A | * | 4/1991 | Miyamoto et al. .......... | 340/459 |
| 5,287,390 A | * | 2/1994 | Scarola et al. .............. | 340/525 |
| 5,539,474 A | * | 7/1996 | Tsunetomi et al. .......... | 348/556 |
| 6,008,842 A | * | 12/1999 | Nagata ........................ | 348/173 |
| 6,377,275 B1 | * | 4/2002 | Kim ............................ | 345/618 |

* cited by examiner

Primary Examiner—Donnie L. Crosland
(74) Attorney, Agent, or Firm—Birch, Stewart, Kolasch & Birch, LLP

(57) ABSTRACT

A technique for protecting a screen surface from being damaged due to a fixed display operation of an image display apparatus such as a projection TV. The method includes a first step for displaying an alarm message for informing no external signal input in the mode in which an external signal is inputted, a second step for checking whether an external signal is inputted in the state that the first step is being performed and the mode is changed, and a third step for checking whether the alarm message display time of the first step becomes identical with a set display time and displaying an alarm message when the time exceeds the set time and dynamically displaying a random format graphic or character.

16 Claims, 6 Drawing Sheets

SCREEN PROTECTION METHOD FOR IMAGE DISPLAY APPARATUS

BACKGROUND OF THE INVENTION

1. Field of the Invention

The present invention relates to a technique for protecting a screen surface from being damaged due to a fixed display operation of an image display apparatus such as a projection TV, and in particular to a screen protection method for a projection TV which is capable of protecting a screen surface from a continuous alarm message display operation in a state that a still picture is displayed for a long time or an external signal is not inputted.

2. Description of the Background Art

Recently, various kinds of large screen TV sets and projection TVs generally used for a presentation are introduced. The resolutions of the same are greatly enhanced, and the sizes of the same become large.

FIG. 1 is a view illustrating a conventional projection TV which includes an image source unit 1 for generating a bright image and outputting to a lens 2, a lens 2 for adjusting a focus of an image inputted from the image source unit 1 and outputting to a reflection mirror 3, and a reflection mirror 3 for reflecting the image from the lens 2 to a screen portion 4 and displaying the image on the screen portion 4. The operation of the above-described projection TV will be explained.

In the image source unit 1, the image processed by the system is produced and outputs a bright image using a bright light from an inner light source. The lens 2 adjusts a focus of the image inputted from the image source unit 1 and outputs to the reflection mirror 3. In addition, the reflection mirror 3 reflects the image to the screen unit 4 for thereby displaying the image on the screen unit 4.

In a usual time, since motion pictures are continuously displayed on the screen unit 4, a certain portion of the screen unit 4 is not easily damaged.

However, if a still picture is displayed on the screen unit 4 for a long time, or a corresponding signal is not inputted for a long time, a certain portion of the screen unit 4 may be rapidly damaged.

In this case, in the mode for receiving an external input, if the external input is blocked, as shown in FIG. 2, since there is not any external signal, a certain character message for requesting an external signal input may be outputted. In this case, a certain character message is continuously displayed at a certain portion of the screen, so that the portion in which the character message is displayed for a long time may be more rapidly damaged compared to the other portions of the screen.

In order to overcome the above-described problems, as shown in FIG. 2, an alarm character message is outputted for a certain time.

In the above-described conventional projection TV, in the case that an external input signal is blocked, and then in the case that there is no input signal, an alarm character message for requesting signal inputs is displayed. In this case, in order to protect a certain portion of the screen from being rapidly damaged, the output of the alarm character message is blocked after a certain time is elapsed.

Therefore, in the conventional art, a user can not easily recognize whether the projection TV is in a power on mode or a power off mode. In this case, a power consumption is increased. If the above-described situation is continued for a long time, a certain load is concentrated at a certain portion of the screen, so that the portion of the screen is rapidly damaged.

SUMMARY OF THE INVENTION

Accordingly, it is an object of the present invention to provide a screen protection method for a projection TV which is capable of effectively protecting a screen by movably displaying a message on the screen in a horizontal direction not by continuously displaying the message at a certain portion and randomly displaying a graphic or a character message on the screen.

To achieve the above objects, there is provided a screen protection method for a projection TV which includes the steps of displaying an alarm message at a certain portion of a screen, and changing a display position of the alarm message and displaying the alarm message when a fixed type alarm message display time elapses a set time.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The screen protection method for a projection TV according to the present invention includes a first step (S1, S2) for displaying an alarm message for informing no external signal input in the mode in which an external signal is inputted, a second step (S3 through S5) for checking whether an external signal is inputted in the state that the first step is being performed and the mode is changed, and a third step (S6, S7) for checking whether the alarm message display time of the first step becomes identical with a set display time and displaying an alarm message when the time exceeds the set time and dynamically displaying a random format graphic or character.

Figure 1:
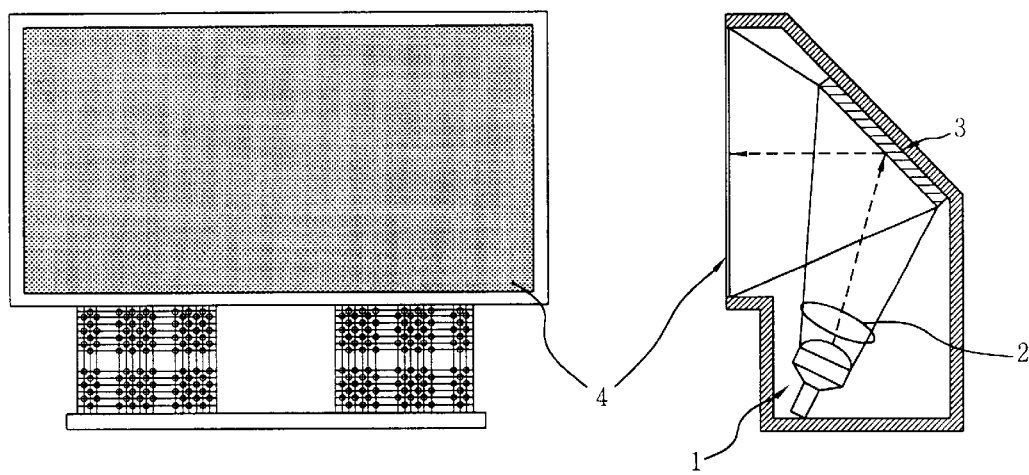
FIG. 1 is a schematic view illustrating a conventional projection TV.
Figure 2:
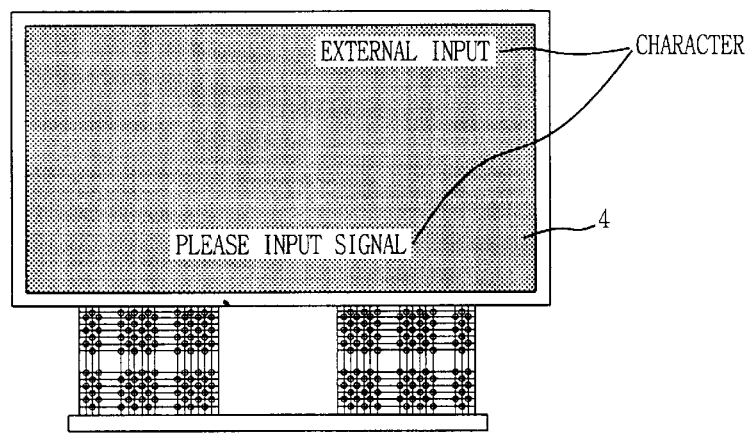
FIG. 2 is a view illustrating an example of an alarm message display in the conventional art.
Figure 3:
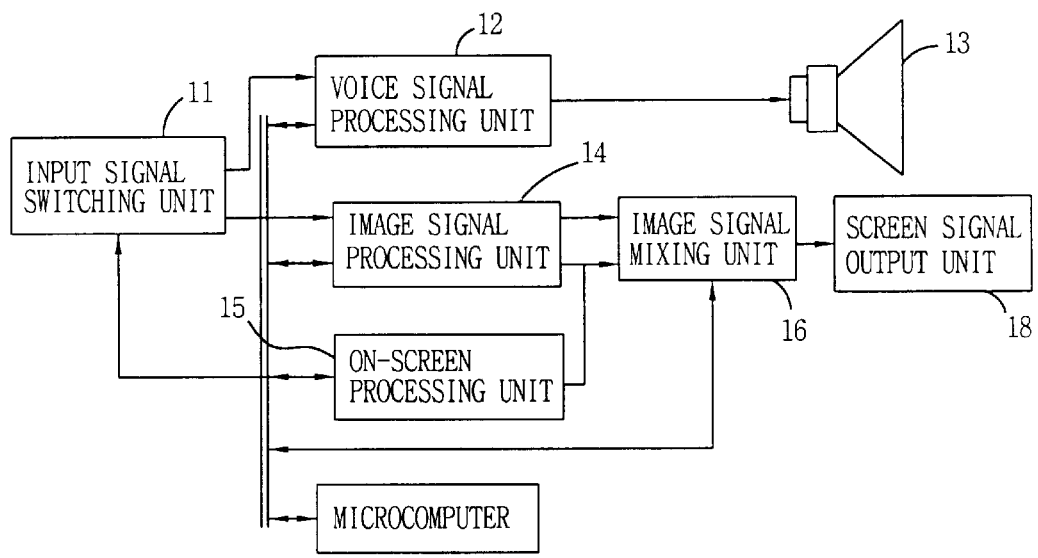
FIG. 3 is a block diagram illustrating a projection TV adapting a screen protection method according to the present invention.
Figure 4:
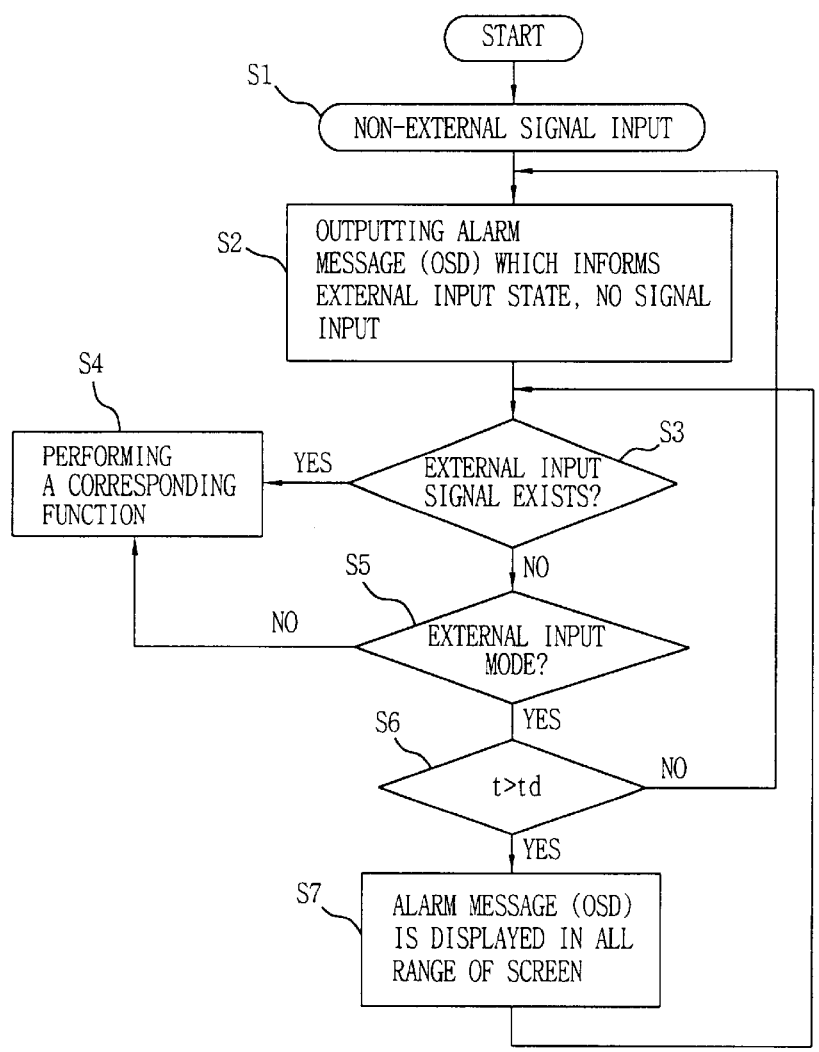
FIG. 4 is a flow chart of a screen projection method according to an embodiment of the present invention.

FIG. 3 is a block diagram of an input/output signal control of a projection TV adapting a screen protection method according to the present invention which includes an input signal switching unit 11 for selecting a broadcast signal from an internal tuner or a signal inputted through an external line and outputting the selected signal, a voice signal processing unit 12 for processing a voice signal inputted through the input signal switching unit 11 and outputting to a speaker 13, an image signal processing unit 14 for processing an image signal inputted through the input signal switching unit 11 and outputting a luminance signal Y1 and a chrominance signal C1, an on-screen processing unit 15 for generating an on-screen character signal in accordance with a control of a microcomputer 17 which will be described later, an image signal mixing unit 16 for switching background image signals Y1 and C1 outputted from the image signal processing unit 14 and character image signals Y2 and C2 outputted from the on-screen processing unit 15 and outputting a mixed image signal, a microcomputer 17 for controlling the whole operation of each element of the system, controlling the on-screen processing unit 15 when no external signal is inputted, and displaying a type alarm message moving on the screen or a mosaic type image message, and a screen output unit 18 including a screen unit for receiving an image signal from the image signal output unit 16 and reproducing an original image. The operation of the above-described method according to the present invention will be explained with reference to FIGS. 4 through 7.

The input signal switching unit 11 selects a broadcast signal inputted through an inner tuner and signal supplied through an external line such as VCR, and the voice signal processing unit 12 reproduces a voice signal outputted from the input signal switching unit 11 and outputting to the speaker 13.

The image signal processing unit 14 processes an image signal outputted from the input signal switching unit 11 and outputs a luminance signal Y1 and a chrominance signal C1 corresponding to the background image signal, and the on-screen processing unit 15 outputs a luminance signal Y2 and a chrominance signal C2 of the on-screen character in accordance with a control of the microcomputer 17.

The background image signals Y1 and C1 and the character image signals Y2 and C2 are mixed by the image signal mixing unit 16 by the field unit or the frame unit and are displayed on the screen unit through the screen signal output unit 18.

Figure 6A:
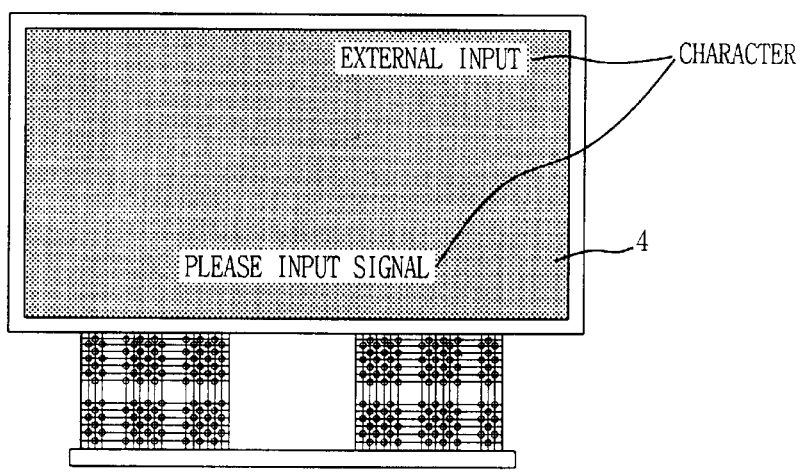
FIGS. 6A through 6C are views illustrating examples of an alarm message display method according to the present invention.
Figure 6B:
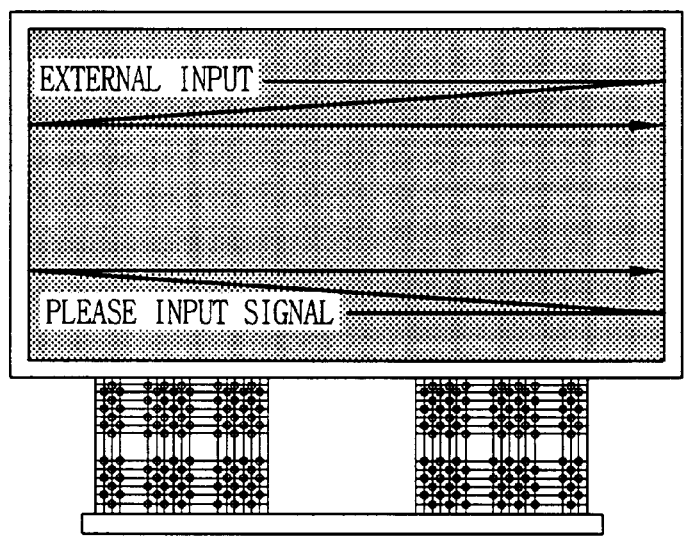
Figure 6C:
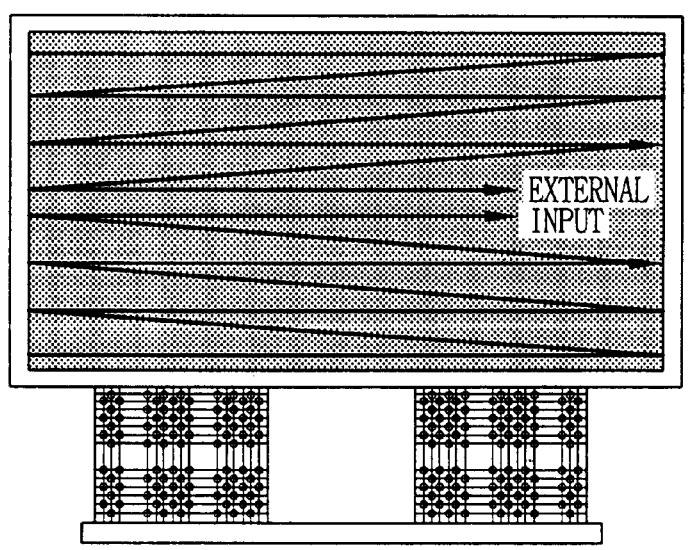
Figure 7A:
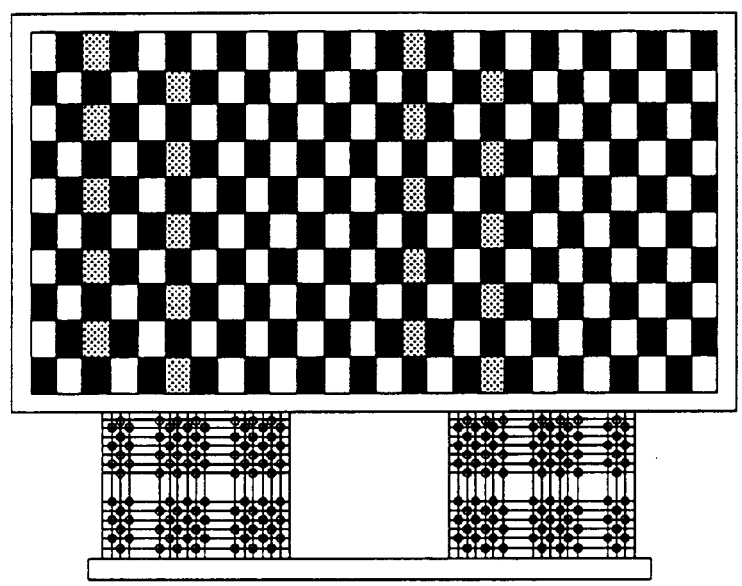
FIGS. 7A and 7B are views illustrating a screen protection method according to still another embodiment of the present invention.
Figure 7B:
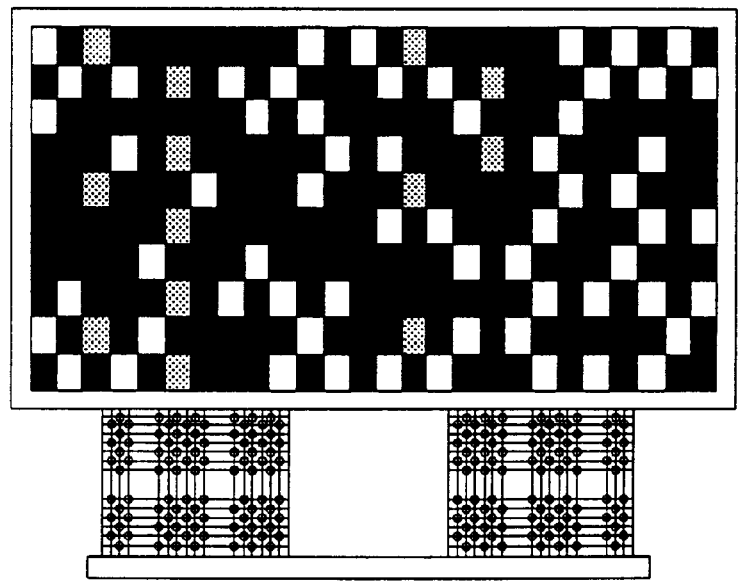

The microcomputer 17 checks an external signal inputted through the input signal switching unit 11 and displayed on the screen is blocked and becomes a non-signal state. In the case of the non-signal state, the microcomputer 17 controls the on-screen processing unit 15, so that an alarm message as shown in FIGS. 6A through 6C is displayed, and a motion picture as shown in FIGS. 7A and 7B is displayed. The above-described control process will be explained in detail.

The non-signal state may be easily judged based on whether a synchronous signal is inputted or not. Therefore, the description thereof will be omitted.

The microcomputer 17 controls the on-screen processing unit 15 and outputs a fixed type alarm message OSD which informs a non-signal state in the mode in which is the TV receives an external signal as shown in FIG. 6A when the microcomputer 17 detects that there is not an external signal input in the mode that the external input signal is inputted through the input signal switching unit 11 in Steps S1 and S2.

Thereafter, it is periodically checked whether an external signal is inputted or not. If it is judged that there is an input signal, a corresponding control function is performed in Steps S3 and S4.

However, if it is judged that an external input signal is not inputted as a result of the check, it is checked whether an external input mode is cancelled by a key operation of a user. If it is judged that the external input mode is cancelled, the routine is returned to the fourth step, and then a corresponding function is performed in Steep S5.

As a result of the judgement of the fifth step S5, if it is judged that the external signal input mode is continuously maintained, the time t required for outputting the alarm message and a previously set reference time $t_d$ are compared. As a result of the comparison, if the elapsed time t is smaller, the routine is returned to the second step S2 in Step S6.

As a result of the check of the sixth step S6, if the alarm message output time t is larger than the set reference time $t_d$, it means that the screen of the projection TV may be damaged during the extended time, so that alarm messages as shown in FIGS. 6B and 6C are displayed on the screen in a scanning direction in Step S7.

The alarm message is displayed like in the seventh step S7, and the routine is returned to the third step S3. In a state that the moving type alarm message is being displayed, if the external input signal is inputted again or an external input mode is cancelled by a key operation of a user, the alarm message displaying operation is stopped, and a corresponding mode is performed.

The reference time $t_d$ represents a time which does not damage the screen of the projection TV and is obtained based on an experimental result. This time may be changed in accordance with the system.

Figure 5:
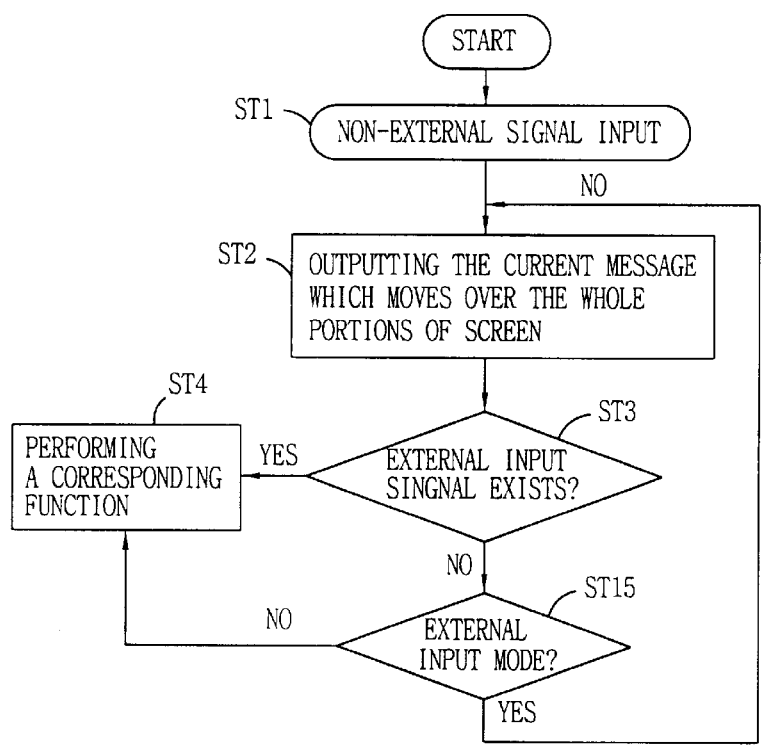
FIG. 5 is a flow chart illustrating a screen protection method according to another embodiment of the present invention.

FIG. 5 is a flow chart illustrating another embodiment of the present invention. Comparing with FIG. 4, the second step S2 and the sixth step S6 are omitted. In this case, if it is judged that there is not an external input signal in the mode in which the external input signal is received, the above-described alarm message is displayed on the whole portions of the screen in a scanning direction.

FIGS. 7A and 7B illustrate that a certain portion of the screen is protected in the non-signal state. Namely, various colors or graphics may be movably displayed on the whole portions of the screen at a certain speed or may be randomly displayed at a certain portion of the screen.

As described above, in the present invention, when an input signal is blocked in the external signal input mode, and then a non-signal state is obtained, an alarm message character information is sequentially displayed on the screen in a scanning direction, and a graphic or a combination of the character and graphic may be randomly or sequentially displayed on the whole portions of the screen, so that it is possible to strongly transfer the current screen state to a user, and the continuity of the display operation is implemented, and an image load is uniformly distributed on the whole portions of the screen for thereby preventing a certain portion of the screen from being damaged.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A screen protection method, which comprises:

providing an image display apparatus of a projection screen TV;

displaying a fixed alarm message at a certain portion of a projection screen; and randomly changing a display position of the fixed alarm message and displaying the fixed alarm message when a fixed alarm message display time elapses a set time.

2. The method of claim 1, wherein said alarm message is an alarm message informing that there is not an external input signal.

3. The method of claim 2, wherein said alarm message output is stopped when an external signal is inputted after the alarm message is displayed or the mode is changed.

4. The method of claim 1, wherein said alarm message is a character or a graphic.

5. The method of claim 1, wherein a display position of the alarm message is changed in a horizontal direction or a vertical direction.

6. The method of claim 1, wherein a display position of the alarm message is changed in a diagonal direction or a scanning direction.

7. A screen protection method, which comprises:
providing an image display apparatus of a projection screen TV;
displaying an alarm message at a certain portion of a projection screen; and
randomly changing a display position of the alarm message at a certain period and displaying the alarm message.

8. The method of claim 7, wherein said alarm message is an alarm message informing that there is not an external input signal.

9. The method of claim 8, wherein said alarm message output is stopped when an external signal is inputted after the alarm message is displayed or the mode is changed.

10. The method of claim 7, wherein said alarm message is a character or a graphic.

11. The method of claim 7, wherein a display position of the alarm message is changed in a horizontal direction or a vertical direction.

12. The method of claim 7, wherein a display position of the alarm message is changed in a diagonal direction or a scanning direction.

13. A screen protection method, which comprises:
providing an image display apparatus;
displaying a fixed alarm message at a certain portion of a TV projection screen; and
randomly changing a display position of the fixed alarm message and displaying the alarm message when a fixed alarm message display time elapses a set time.

14. A screen protection method for an image display apparatus, comprising the steps of:
displaying an alarm message at a certain portion of a TV projection screen; and
randomly changing a display position of the alarm message at a certain period and displaying the alarm message.

15. A screen protection method, which comprises:
providing an image display apparatus of a projection screen TV;
displaying a fixed alarm message at a certain portion of a projection screen; and
changing a fixed alarm message and a display position of the same when a fixed alarm message display time elapses a set time and displaying the fixed alarm message, wherein the display position of the fixed alarm message is randomly changed.

16. A screen protection method, which comprises:
providing an image display apparatus of a projection screen TV;
displaying an alarm message at a certain portion of a projection screen; and
changing the alarm message and a display position of the same at a certain period and displaying the alarm message, wherein the display position of the fixed alarm message is randomly changed.

* * * * *